United States Patent [19]

Yokota

[11] Patent Number: 5,044,693
[45] Date of Patent: Sep. 3, 1991

[54] SEAT BACK STRUCTURE OF AN AUTOMOTIVE SEAT

[75] Inventor: Masaaki Yokota, Akishima, Japan

[73] Assignee: Tachi-S Co., Ltd., Tokyo, Japan

[21] Appl. No.: 429,422

[22] Filed: Oct. 31, 1989

[51] Int. Cl.$^5$ .............................................. A47C 7/02
[52] U.S. Cl. ..................... 297/452; 297/284
[58] Field of Search ............... 297/452, 234, 285, 460

[56] References Cited

U.S. PATENT DOCUMENTS

| 3,762,769 | 10/1973 | Poschl | 297/460 X |
| 4,231,615 | 11/1980 | Griffiths | 297/452 |
| 4,565,406 | 1/1986 | Suzuki | 297/284 |
| 4,588,172 | 5/1986 | Fourrey et al. | 297/289 X |
| 4,682,763 | 7/1987 | Kazaoka et al. | 297/452 X |
| 4,725,095 | 2/1988 | Benson et al. | 297/460 X |

FOREIGN PATENT DOCUMENTS

| 1914154 | 6/1971 | Fed. Rep. of Germany | 297/284 |
| 2724725 | 12/1977 | Fed. Rep. of Germany | 297/284 |
| 3223815 | 1/1983 | Fed. Rep. of Germany | 297/460 |
| 0018428 | 1/1985 | Japan | 297/284 |
| 654734 | 3/1986 | Switzerland | 297/452 |

Primary Examiner—Jose V. Chen
Attorney, Agent, or Firm—Browdy and Neimark

[57] ABSTRACT

A seat back structure of an automotive seat comprising a back support plate, plural springs, and torsion bar. The back support plate is supported in a seat back frame by the springs and torsion bar in a more positively resilient way. The provision of the torsion bar avoids the sudden backward movement of the back support plate which has been found in a conventional seat back structure wherein the support plate is only supported by springs.

1 Claim, 2 Drawing Sheets

SEAT BACK STRUCTURE OF AN AUTOMOTIVE SEAT

BACKGROUND OF THE INVENTION

1. Field of the Invention

The present invention relates to a seat back structure of an automotive seat, and in particular is directed to a back support structure of the seat back.

2. Description of Prior Art

The recent years have seen a certain improvement in a seat technology field, especially many seat technical people having made an attempt to improve a support structure of the seat. The same concern has also been drawn to the back support structure of a seat back forming one of the seat, and for instance, it has been seen that the provision of a synthetic resin back support plate within the seat back is effective in supporting the upper back part and lumbar part of an occupant on the seat at a pleasant touch. Such resin back support plate is made of such relatively hard yet somewhat elastic synthetic resin as P.V.C., polyethylen, resin, polystyrene resin, or polymide; resin, which should be provided a proper flexture property by adding a certain amount of plasticizer therein.

As an example of the seat back of this kind, reference is made to FIGS. 1 through 3, in which FIG. 1 shows a general structure of a seat back (3) in an automotive seat (1). Designation (2) denotes a seat cushion connected with the seat back. In FIG. 1, in general, a back support plate (P) of a synthetic resin is provided within the seat back (3), supported elastically by a seat back frame (F), and covered with a cushion layer (32) and top cover layer (31), as shown.

FIGS. 2 and 3 show a conventional seat back structure. Designation (16) shows a seat back frame which is to be provided within the foregoing seat back (3). On the lateral frame sections of the seat back frame (16), are fixed respectively two side auxiliary frames (18). Each of the side auxiliary frames (18) is formed with three securing lugs (19) projecting inwardly of the frame (16). Generally centrally of the seat back frame (16), is disposed a back support plate (14) made of such synthetic resin material as mentioned above. The back support plate (14) is formed with plurality of small holes (15), as shown, which serve to render more elastic the back support plate (14) for the purpose of giving a most comfortable support touch to the back part of the occupant. The back support plate (4) is resiliently supported within the frame (16) by means of an upper set of tension springs (17a) (17a), an intermediate set of tension springs (17b) (17b), and a lower set of tension springs (17c) (17c), all of those springs are extended between the respective securing lugs (19) and lateral edge of the support plate (14). In this regard, each of the springs (17a) (17d) (17c) is fitted at its one hook end part in the respective securing holes (19a) of the securing lugs (19) and at its other hook end part in the respective most lateral-side holes (15) of the support plate (14), as best seen from FIG. 3. The back support plate (14) is formed in a little wavy contour conforming to that of occupant's standard back, and the lower set of tension springs (17c)(17c) are of a higher resiliency than other ones (17a)(17b), with a view to improving a back support comfort of the seat back.

However, an upleasing objection is still raised from the occupant with regard to the support touch of the abovementioned prior art: As the back support plate (14) is resiliently supported only by the springs (17a)(17b)(17c), when a load (F) is applied to the support plate (14), as in FIG. 3, initially, the support plate (14) is not given the direct resilient repercussive force of the springs (17a)(14b)(17c), by reason of the fact that, in such case, the springs (17a)(17b)(17c) are simply fitted in both securing holes (19a) of the securing lugs (19) and holes of the support plate (14) and thus, rotated downwardly from the solid line to the phantom line about their respective securing holes (19a), without being applied the direct downward load (F). As a result, the occupant feels a sudden backward movement in the seat back and uneasy with such insufficient support touch.

SUMMARY OF THE INVENTION

With the above-stated drawbacks in view, it is therefore a purpose of the present invention to provide an improved seat back structure of an automotive seat which gives a sufficient resilient support to the back part of an occupant on the seat.

In achievement of the purpose, in accordance with the present invention, a back support plate made of the above-stated synthetic resin material is resiliently supported in a seat back frame by means of a plurality of tension springs and a torsion bar. The tension springs are disposed at the upper portion of both support plate and seat back frame, whereas the torsion bar is disposed at the lower end portion of them, substantially at a point corresponding to the lumbar support part of the seat.

Accordingly, the provision of the torsion bar supports positively the back support plate and thus avoids such initial backward movement of the back support plate, when being applied a load thereupon, as found in the foregoing prior art. Moreover, the lumbar support area of the seat back is given a more resilient support touch by the dual resilient structure of those torsion bar and corresponding part of the back support plate per se, which provides a more matching and comfortable touch at the lumbar part of an occupant sitting on the seat.

DETAILED DESCRIPTION OF PREFERRED EMBODIMENT OF THE INVENTION

Figure 4:
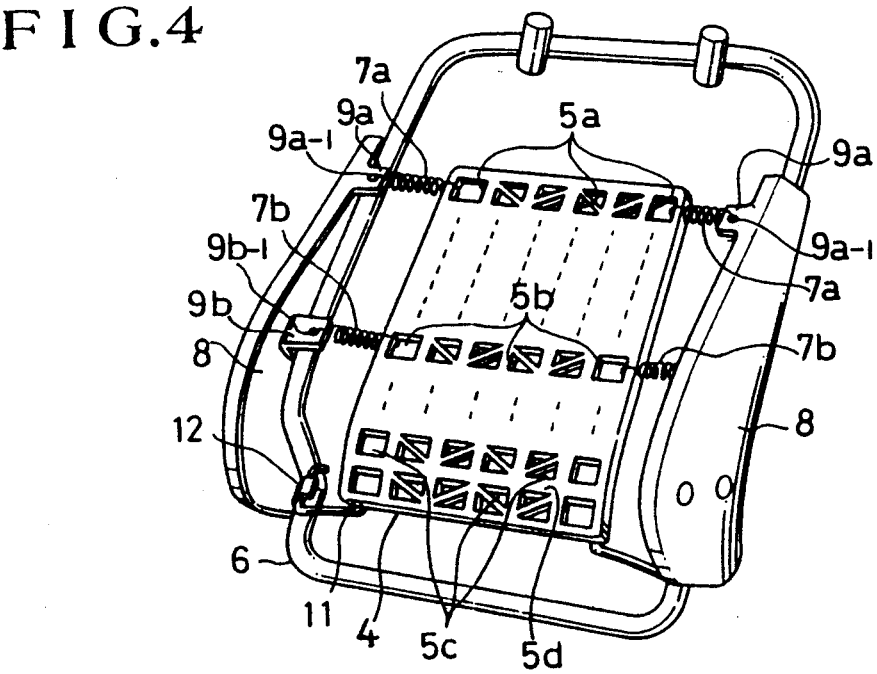
FIG. 4 is a perspective view of a seat back frame structure in accordance with the present invention.
Figure 5:
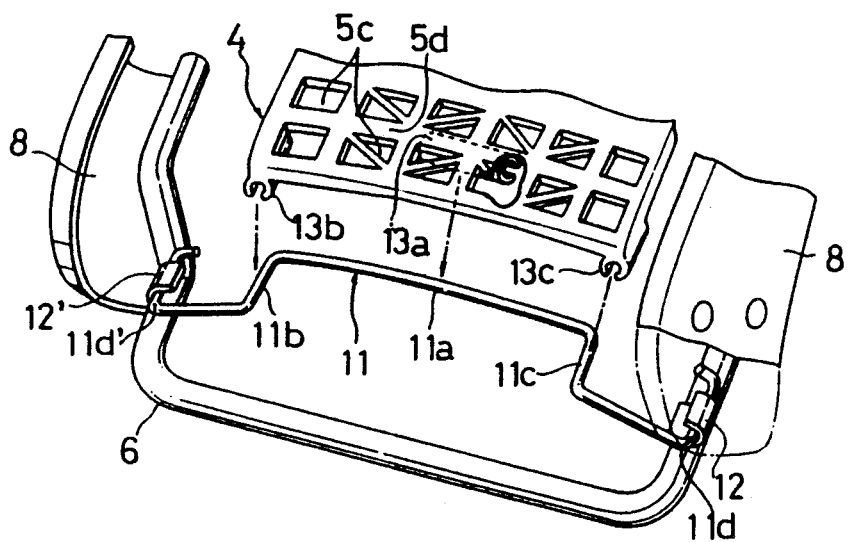
FIG. 5 is a cross-sectional view of the seat back frame structure as in the FIG. 4.
Figure 6:
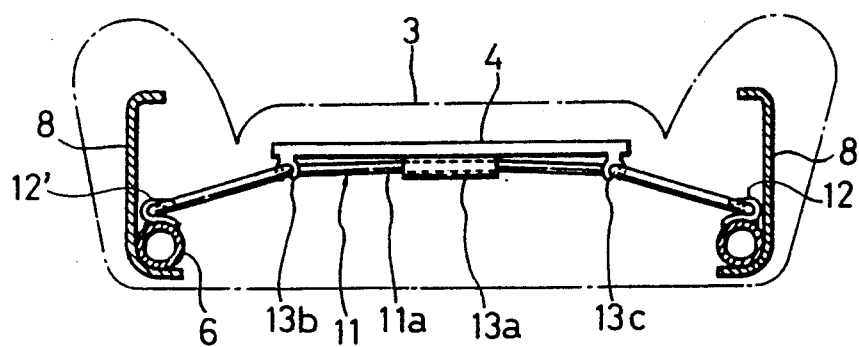
FIG. 6 is partially broken, exploded perspective view of the same seat back frame structure, which shows the principal part thereof.

Referring to FIGS. 4 through 6, there is illustrated a preferred embodiment of the present invention.

Figure 1:
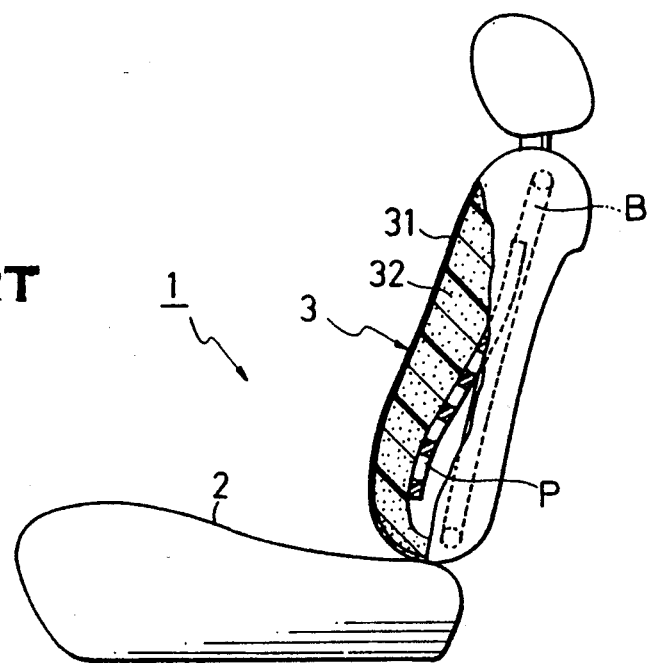
FIG. 1 is a side view of an automotive seat, which shows a general seat back structure.
Figure 2:
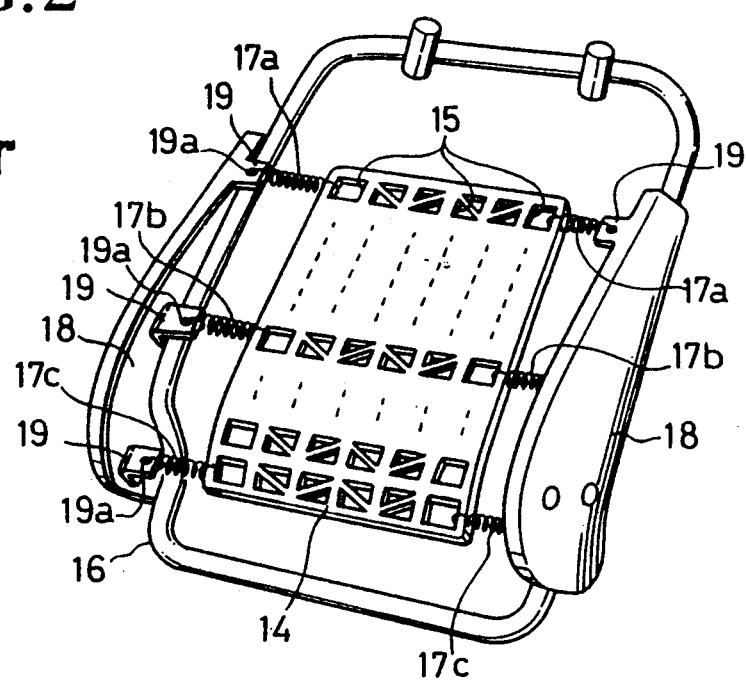
FIG. 2 is a perspective view of a conventional seat back frame structure.
Figure 3:
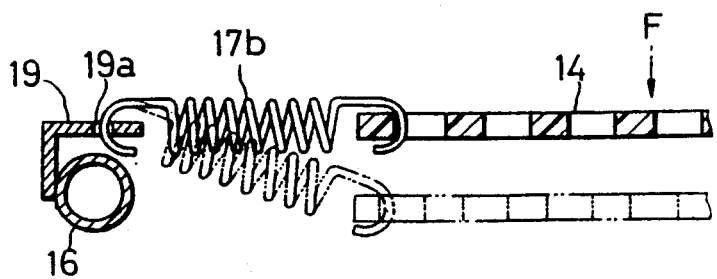
FIG. 3 is a partial sectional view of the conventional seat back frame structure, showing the drawback thereof.

Designation (6) denotes a seat back frame which is to be provided within the seat back (3) of automotive seat (1) as in FIG. 1. The seat back frame (6) is formed in a generally square-like shape by use of a tubular material. On the respective lateral frame sections of the frame (6), are fixed a pair of opposed side auxiliary frames (8)(8).

Each of the two side auxiliary frames (8)(8) is formed with a first securing lug (9a) at its upper part and a second securing lug (9b) at its intermediate part.

On the lower regions respectively of both lateral frame sections of the frame (5), as best seen in FIG. 5, there are fixedly provided a pair of clamps (11d)(11d'), with their respective opened sides facing inwardly of the frame (14) towards each other.

Designation (11) refers to a torsion bar of the illustrated configuration, which is formed by bending a basic straight-line bar to define a generally inverted U-shaped portion in its central part, which inverted U-shaped portion is composed of a transverse central bar section (11a) and a pair of longitudinal side bar sections (11b)(11c) such that the latter sections (11b)(11c) extend downwardly at a right angle from both ends of the former section (11a) in a continuous way. Further, both lateral end parts of thus formed torsion bar (11) are formed with upturned securing bar sections (11d)(11d') by being bent upwardly. It is noted here that the entire length of such torsion bar (11) is somewhat greater than the distance between the two clamps (12)(12') on the seat back frame (6).

The foregoing torsion bar (11) is secured upon the lower part of the seat back frame (6) by, firstly, curving the torsion bar (11) on the whole in a cambered or forwardly arced manner, to such a degree that its upturned securing bar sections (11d)(11d') are displaced inwardly toward each other so as to present a smaller width than the distance between the two clamps (12)(12') and then inserting the securing bar sections (11d)(11d') into the clamps (12)(12'), respectively. Thus, as can be seen from FIGS. 5 and 6, the torsion bar (11) is secured at the lower end portion of the seat back frame (6) in a cambered manner, extending transversely thereof.

As shown in FIG. 4, within the seat back frame (6), is disposed a back support plate (4) made of such a relatively hard yet elastic synthetic resin as P.V.C., polyethylen resin, polystyrene resin or polyamide resin, as stated previously in the prior art description.

The back support plate (4) is formed in a little wavy contour conforming to that of an occupan's back, and formed with three rows of holes (5a)(5b)(5c) which are spaced apart from one another in the height-wise direction of the plate (4), as shown. The lower row of holes (5c) is depicted as having a dual hole row relative to other ones (5a)(5b) of single row, and a straight ridge (5d) is defined centrally of the dual hole row of holes (5c), extending therethrough. The lower-row holes (5c) are located at a point corresponding to the lumbar part of an occupant who sits on the seat (1), which provides a certain flexure of the back support plate (4) at its lumbar support area. Referring to FIG. 5, at the reverse side and lower end part of the back support plate (4), there are integrally formed a first capturing member (13a), a second capturing member (13b) and a third capturing member (13c). Those capturing members (13a)(13b)(13c) are adapted for securely receiving the torsion bar (11) therein. Specifically, the first capturing member (13a) is disposed midway at the ridge (51a), extending in its longitudinal direction, while on the other hand, the second and third capturing members (13b)(13c) are respectively disposed at the lower areas of both lateral edges of the support plate (4), extending along the longitudinal direction of those lateral edges of the support plate (4). Into those first, second and third capturing members (13a)(13b)(13c), are respectively inserted securely the transverse bar section (11a), one longitudinal side bar section (11b) and other longitudinal side bar section (11c), of the torsion bar (11), whereupon the lower part of the support plate (4) is secured with respect to the corresponding part of the seat back frame (6) via the torsion bar (11). Then, between the first securing lug (9a) and lateral edge part of the back support plate (4), there extends a first tension spring (7a), and between the second securing lug (9b) and lateral edge part of the plate (4), extended is a second tension spring (7b). More specifically, as viewed from FIG. 4, one of the two first tension springs (7a)(7a) is at its one hook end fitted in the securing hole (9a-1) of the right-side securing lug (9a) and at its other opposite hook end fitted in the right-side most lateral one of the first row of holes (5a), whereas the other of the springs (7a)(7a) is at its one hook end fitted in the securing hole (9a-1) of the first lug (9a) and at its other hook end fitted in the left-side most lateral one of the first row of holes (5a). Likewise, one of the two second tension springs (7b) (7b) is at its one hook end fitted in the securing hole (9b-1) of the right-side securing lug (9a) and at its other opposite hook end fitted in the righ-side most lateral one of the second row of holes (5b, whereas the other of the springs (7b)(7b) is at its one hook end fitted in the left-side securing lug (9b) (not shown) and at its other hook end fitted in the left-side most lateral one of the second row of holes (5b). In that way, the back support plate (4) is resiliently supported within the seat back frame (6).

Accordingly, with the above-described structure, when a load is applied to the back support plate (4), the provision of the torsion bar (11) produces a repercussive force against the load, thereby avoiding such sudden initial backward movement of the support plate (4) as found in the prior art.

Additionally, it is to be appreciated that the lower end area of the back support plate (4), in which there exit the third row of holes (5c) and torsion bar (11), produces a double flexure effect to give a twice as soft cushiony touch to the lumbar part of an occupant sitting on the seat, by the reason of the dual row of holes (5c) rendering more elastic the lumbar support area upon the central inverted U-shaped portion of the torsion bar (11), thereby forming a more elastic layer upon the torsion bar (11). This permits providing a very fine shade of flexure property at the lumbar support part of the seat back, so that different contour of individual occupant's lumbar part may be received in a more matching way by the corresponding area of the back support plate (4).

While having described the present invention as above, it should be understood that the invention is not limited to the illustrated embodiment, but other various modifications, replacements and additions may structurally be possible without departing from the spirits and scopes of the appended claims. For example, the torsion bar (11) is not limited to the shape in the drawings, but may be formed in any other shape inasmuch as it gives a sufficient resilient support. The present invention may be applicable to an ordinary furniture seat.

What is claimed is:

1. A seat back structure of an automotive seat, comprising:
    a seat back frame having a space therein defined by its frame sections;
    a back support plate disposed within said space of said seat back frame;

a torsion bar for elastically supporting a lower end area of said back support plate;

plural pairs of tension springs which are so arranged between said seat back frame and back support plate that each pair of springs are extended in respective pair of spaces laterally between one lateral frame section of said seat back frame and one lateral edge of said seat support plate and between the other lateral frame section of said seat back frame and the other lateral edge of said seat support plate, wherein all those pairs of tension springs are disposed above said torsion bar, and adapted for elastically supporting an upper area of said back support frame;

said torsion bar being at its both ends secured rotatably on the respective said lateral plate sections of said seat back plate, and so elastically bent as to give such cambered configure that its central part is projected forwardly relative to secured points where said torsion bar is secured on said lateral plate sections of said seat back plate, whereby back support force of said torsion bar is greater than that of said tension springs; and wherein to said forwardly curved central part of said torsion bar, is fixed to said back support plate.

* * * * *